US011956191B2

(12) United States Patent
Hviid

(10) Patent No.: US 11,956,191 B2
(45) Date of Patent: *Apr. 9, 2024

(54) AUDIO-BASED SOCIAL MEDIA PLATFORM

(71) Applicant: BRAGI GmbH, Munich (DE)

(72) Inventor: Nikolaj Hviid, Munich (DE)

(73) Assignee: BRAGI GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,885

(22) Filed: Apr. 6, 2023

(65) Prior Publication Data

US 2023/0246987 A1 Aug. 3, 2023

Related U.S. Application Data

(63) Continuation of application No. 17/677,597, filed on Feb. 22, 2022, now Pat. No. 11,627,105, which is a
(Continued)

(51) Int. Cl.
*H04L 51/10* (2022.01)
*G06F 3/16* (2006.01)
*H04L 51/212* (2022.01)
*H04L 51/222* (2022.01)
*H04L 51/42* (2022.01)
(Continued)

(52) U.S. Cl.
CPC ............. *H04L 51/10* (2013.01); *G06F 3/167* (2013.01); *H04L 51/52* (2022.05); *H04R 1/1016* (2013.01); *H04L 51/212* (2022.05); *H04L 51/222* (2022.05); *H04L 51/42* (2022.05); *H04R 2225/55* (2013.01); *H04R 2420/07* (2013.01)

(58) Field of Classification Search
CPC ......... H04L 51/10; H04L 51/52; H04L 51/42; H04L 51/212; H04L 51/22; G06F 3/167; H04R 2225/55
See application file for complete search history.

(56) References Cited

U.S. PATENT DOCUMENTS 2,325,590 A 8/1943 Carlisle et al.
2,430,229 A 11/1947 Kelsey
(Continued)

FOREIGN PATENT DOCUMENTS

CN 204244472 U 4/2015
CN 104683519 A 6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Mahran Y Abu Roumi
(74) *Attorney, Agent, or Firm* — Goodhue, Coleman & Owens, P.C.

(57) ABSTRACT

A method for audio-based social media messaging for a wearable device includes generating a first audio message using a wearable device, the wearable device having at least one microphone and at least one speaker and conveying the first audio message from the wearable device to an audio-based social media platform using a wireless radio transceiver within the wearable device.

19 Claims, 7 Drawing Sheets

Related U.S. Application Data continuation of application No. 15/716,204, filed on Sep. 26, 2017, now Pat. No. 11,283,742.

(60) Provisional application No. 62/400,391, filed on Sep. 27, 2016.

(51) Int. Cl.
*H04L 51/52* (2022.01)
*H04R 1/10* (2006.01)

(56) References Cited

U.S. PATENT DOCUMENTS

| | | | |
|---|---|---|---|
| 3,047,089 A | 7/1962 | Zwislocki | |
| D208,784 S | 10/1967 | Sanzone | |
| 3,586,794 A | 6/1971 | Michaelis | |
| 3,934,100 A | 1/1976 | Harada | |
| 3,983,336 A | 9/1976 | Malek et al. | |
| 4,069,400 A | 1/1978 | Johanson et al. | |
| 4,150,262 A | 4/1979 | Ono | |
| 4,334,315 A | 6/1982 | Ono et al. | |
| D266,271 S | 9/1982 | Johanson et al. | |
| 4,375,016 A | 2/1983 | Harada | |
| 4,588,867 A | 5/1986 | Konomi | |
| 4,617,429 A | 10/1986 | Bellafiore | |
| 4,654,883 A | 3/1987 | Iwata | |
| 4,682,180 A | 7/1987 | Gans | |
| 4,791,673 A | 12/1988 | Schreiber | |
| 4,852,177 A | 7/1989 | Ambrose | |
| 4,865,044 A | 9/1989 | Wallace et al. | |
| 4,984,277 A | 1/1991 | Bisgaard et al. | |
| 5,008,943 A | 4/1991 | Arndt et al. | |
| 5,185,802 A | 2/1993 | Stanton | |
| 5,191,602 A | 3/1993 | Regen et al. | |
| 5,201,007 A | 4/1993 | Ward et al. | |
| 5,201,008 A | 4/1993 | Arndt et al. | |
| D340,286 S | 10/1993 | Seo | |
| 5,251,327 A * | 10/1993 | Lenchik | H04W 84/08 455/518 |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,347,584 A | 9/1994 | Narisawa | |
| 5,363,444 A | 11/1994 | Norris | |
| D367,113 S | 2/1996 | Weeks | |
| 5,497,339 A | 3/1996 | Bernard | |
| 5,606,621 A | 2/1997 | Reiter et al. | |
| 5,613,222 A | 3/1997 | Guenther | |
| 5,654,530 A | 8/1997 | Sauer et al. | |
| 5,692,059 A | 11/1997 | Kruger | |
| 5,721,783 A | 2/1998 | Anderson | |
| 5,748,743 A | 5/1998 | Weeks | |
| 5,749,072 A | 5/1998 | Mazurkiewicz et al. | |
| 5,771,438 A | 6/1998 | Palermo et al. | |
| D397,796 S | 9/1998 | Yabe et al. | |
| 5,802,167 A | 9/1998 | Hong | |
| D410,008 S | 5/1999 | Almqvist | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,084,526 A | 7/2000 | Blotky et al. | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,230,029 B1 | 5/2001 | Yegiazaryan et al. | |
| 6,275,789 B1 | 8/2001 | Moser et al. | |
| 6,339,754 B1 | 1/2002 | Flanagan et al. | |
| D455,835 S | 4/2002 | Anderson et al. | |
| 6,408,081 B1 | 6/2002 | Boesen | |
| 6,424,820 B1 | 7/2002 | Burdick et al. | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,690,807 B1 | 2/2004 | Meyer | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,010,137 B1 | 3/2006 | Leedom et al. | |
| 7,113,611 B2 | 9/2006 | Leedom et al. | |
| D532,520 S | 11/2006 | Kampmeier et al. | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| D549,222 S | 8/2007 | Huang | |
| D554,756 S | 11/2007 | Sjursen et al. | |
| 7,403,629 B1 | 7/2008 | Aceti et al. | |
| D579,006 S | 10/2008 | Kim et al. | |
| 7,463,902 B2 | 12/2008 | Boesen | |
| 7,508,411 B2 | 3/2009 | Boesen | |
| D601,134 S | 9/2009 | Elabidi et al. | |
| 7,650,170 B2 * | 1/2010 | May | H04M 1/6066 455/412.2 |
| 7,825,626 B2 | 11/2010 | Kozisek | |
| 7,965,855 B1 | 6/2011 | Ham | |
| 7,979,035 B2 | 7/2011 | Griffin et al. | |
| 7,983,628 B2 | 7/2011 | Boesen | |
| D647,491 S | 10/2011 | Chen et al. | |
| 8,095,188 B2 | 1/2012 | Shi | |
| 8,108,143 B1 | 1/2012 | Tester | |
| 8,140,357 B1 | 3/2012 | Boesen | |
| D666,581 S | 9/2012 | Perez | |
| 8,300,864 B2 | 10/2012 | Müllenborn et al. | |
| 8,406,448 B2 | 3/2013 | Lin et al. | |
| 8,436,780 B2 | 5/2013 | Schantz et al. | |
| D687,021 S | 7/2013 | Yuen | |
| 8,719,877 B2 | 5/2014 | Vondoenhoff et al. | |
| 8,774,434 B2 | 7/2014 | Zhao et al. | |
| 8,831,266 B1 | 9/2014 | Huang | |
| 8,891,800 B1 | 11/2014 | Shaffer | |
| 8,994,498 B2 | 3/2015 | Agrafioti et al. | |
| D728,107 S | 4/2015 | Martin et al. | |
| 9,013,145 B2 | 4/2015 | Castillo et al. | |
| 9,037,125 B1 | 5/2015 | Kadous | |
| D733,103 S | 6/2015 | Jeong et al. | |
| 9,081,944 B2 | 7/2015 | Camacho et al. | |
| 9,313,317 B1 * | 4/2016 | LeBeau | H04L 51/224 |
| 9,408,048 B1 * | 8/2016 | Paulrajan | H04W 4/60 |
| 9,510,159 B1 | 11/2016 | Cuddihy et al. | |
| D773,439 S * | 12/2016 | Walker | D14/223 |
| D775,158 S * | 12/2016 | Dong | D14/485 |
| D777,710 S * | 1/2017 | Palmborg | D14/223 |
| D788,079 S | 5/2017 | Son et al. | |
| 10,042,821 B1 * | 8/2018 | Cronin | G10L 25/72 |
| 10,088,921 B2 * | 10/2018 | Hardi | G06F 3/03547 |
| 2001/0005197 A1 | 6/2001 | Mishra et al. | |
| 2001/0027121 A1 | 10/2001 | Boesen | |
| 2001/0043707 A1 | 11/2001 | Leedom | |
| 2001/0056350 A1 | 12/2001 | Calderone et al. | |
| 2002/0002413 A1 | 1/2002 | Tokue | |

(56) References Cited

U.S. PATENT DOCUMENTS

| | | |
|---|---|---|
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0048627 A1* | 3/2004 | Olvera-Hernandez ............ H04W 4/14 455/466 |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2006/0274856 A1* | 12/2006 | Dunn ............ H04L 63/045 375/316 |
| 2008/0076972 A1 | 3/2008 | Dorogusker et al. |
| 2008/0090622 A1 | 4/2008 | Kim et al. |
| 2008/0146890 A1 | 6/2008 | LeBoeuf |
| 2008/0253583 A1* | 10/2008 | Goldstein ............ H04R 3/04 381/92 |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0041447 A1* | 2/2010 | Graylin ............ G10L 15/26 704/E15.001 |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2013/0197907 A1* | 8/2013 | Burke ............ G10L 15/26 704/231 |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0095682 A1* | 4/2014 | Yablokov ............ H04W 12/37 709/223 |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0187188 A1* | 7/2015 | Raskin ............ H04M 1/72412 340/407.1 |
| 2015/0213208 A1* | 7/2015 | Zhang ............ A61B 5/0205 600/490 |
| 2015/0245127 A1 | 8/2015 | Shaffer |
| 2015/0382138 A1* | 12/2015 | Bose ............ H04M 1/72433 455/456.3 |
| 2016/0033280 A1* | 2/2016 | Moore ............ G01C 21/1656 701/472 |
| 2016/0072558 A1 | 3/2016 | Hirsch et al. |
| 2016/0073189 A1 | 3/2016 | Lindén et al. |
| 2016/0080295 A1* | 3/2016 | Davies ............ H04M 3/533 709/204 |
| 2016/0125892 A1 | 5/2016 | Bowen et al. |
| 2016/0275076 A1* | 9/2016 | Ishikawa ............ G06F 40/58 |
| 2016/0360350 A1 | 12/2016 | Watson et al. |
| 2017/0041699 A1* | 2/2017 | Mackellar ............ A61B 5/02405 |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061200 A1* | 3/2017 | Wexler ............ H04N 23/61 |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0105096 A1* | 4/2017 | Olson ............ H04B 17/318 |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0180923 A1* | 6/2017 | Barron ............ H04R 5/0335 |
| 2017/0188127 A1 | 6/2017 | Perianu et al. |
| 2017/0188132 A1 | 6/2017 | Hirsch et al. |
| 2017/0195829 A1 | 7/2017 | Belverato et al. |
| 2017/0206899 A1* | 7/2017 | Bryant ............ G10L 15/22 |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0257698 A1 | 9/2017 | Boesen et al. |

(56) References Cited

U.S. PATENT DOCUMENTS

| | | | | |
|---|---|---|---|---|
| 2017/0274267 | A1* | 9/2017 | Blahnik | A63B 24/0062 |
| 2017/0279751 | A1* | 9/2017 | Quirarte | H04L 51/08 |
| 2017/0374448 | A1* | 12/2017 | Patel | H04R 29/001 |
| 2018/0007210 | A1* | 1/2018 | Todasco | H04M 3/53366 |
| 2018/0069815 | A1* | 3/2018 | Fontana | H04L 51/58 |
| 2018/0364825 | A1* | 12/2018 | Hardi | G06F 3/04883 |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 11/1981 |
| GB | 2508226 | A | 5/2014 |
| WO | 2008103925 | A1 | 8/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |

OTHER PUBLICATIONS

Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is On Facebook (2014), pp. 1-51.
Bragi Update—Arrival Of Prototype Chassis Parts—More People—Awesomeness (May 13, 2014), pp. 1-8.
Bragi Update—Chinese New Year, Design Verification, Charging Case, More People, Timeline(Mar. 6, 2015), pp. 1-18.
Bragi Update—First Sleeves From Prototype Tool—Software Development Kit (Jun. 5, 2014), pp. 1-8.
Bragi Update—Let's Get Ready To Rumble, A Lot To Be Done Over Christmas (Dec. 22, 2014), pp. 1-18.
Bragi Update—Memories From April—Update On Progress (Sep. 16, 2014), pp. 1-15.
Bragi Update—Memories from May—Update On Progress—Sweet (Oct. 13, 2014), pp. 1-16.
Bragi Update—Memories From One Month Before Kickstarter—Update On Progress (Jul. 10, 2014), pp. 1-17.
Bragi Update—Memories From The First Month of Kickstarter—Update on Progress (Aug. 1, 2014), pp. 1-16.
Bragi Update—Memories From The Second Month of Kickstarter—Update On Progress (Aug. 22, 2014), pp. 1-15.
Bragi Update—New People @BRAGI—Prototypes (Jun. 26, 2014), pp. 1-9.
Bragi Update—Office Tour, Tour To China, Tour to CES (Dec. 11, 2014), pp. 1-14.
Bragi Update—Status On Wireless, Bits and Pieces, Testing-Oh Yeah, Timeline(Apr. 24, 2015), pp. 1-18.
Bragi Update—The App Preview, The Charger, The SDK, BRAGI Funding and Chinese New Year (Feb. 11, 2015), pp. 1-19.
Bragi Update—What We Did Over Christmas, Las Vegas & CES (Jan. 19, 2014), pp. 1-21.
Bragi Update—Years of Development, Moments of Utter Joy and Finishing What We Started(Jun. 5, 2015), pp. 1-21.
Bragi Update—Alpha 5 and Back To China, Backer Day, On Track(May 16, 2015), pp. 1-15.
Bragi Update—Beta2 Production and Factory Line(Aug. 20, 2015), pp. 1-16.
Bragi Update—Certifications, Production, Ramping Up (Nov. 13, 2015), pp. 1-15.
Bragi Update—Developer Units Shipping and Status(Oct. 5, 2015), pp. 1-20.
Bragi Update—Developer Units Started Shipping and Status (Oct. 19, 2015), pp. 1-20.
Bragi Update—Developer Units, Investment, Story and Status(Nov. 2, 2015), pp. 1-14.
Bragi Update—Getting Close(Aug. 6, 2015), pp. 1-20.
Bragi Update—On Track, Design Verification, How It Works and What's Next(Jul. 15, 2015), pp. 1-17.
Bragi Update—On Track, On Track and Gems Overview (Jun. 24, 2015), pp. 1-19.
Bragi Update—Status On Wireless, Supply, Timeline and Open House@BRAGI(Apr. 1, 2015), pp. 1-17.
Bragi Update—Unpacking Video, Reviews On Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces A Health + Mobility Concept For Wellness In Mobility", Fountain Valley, Californa (2017), pp. 1-3.
International Search Report & Written Opinion, PCT/EP2016/070231 (dated Nov. 18, 2016) 12 pages.
Last Push Before The Kickstarter Campaign Ends on Monday 4pm CET (Mar. 28, 2014), pp. 1-7.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

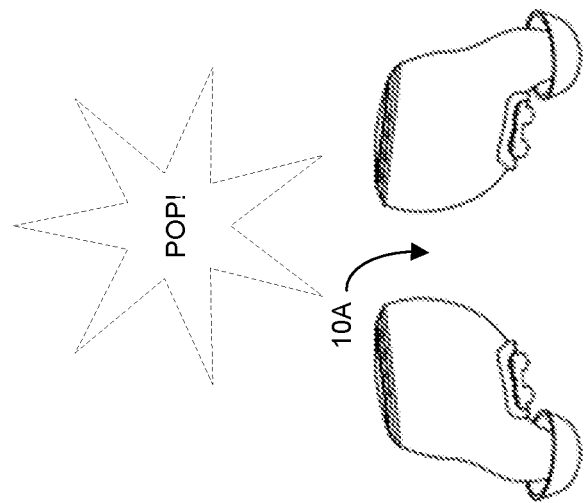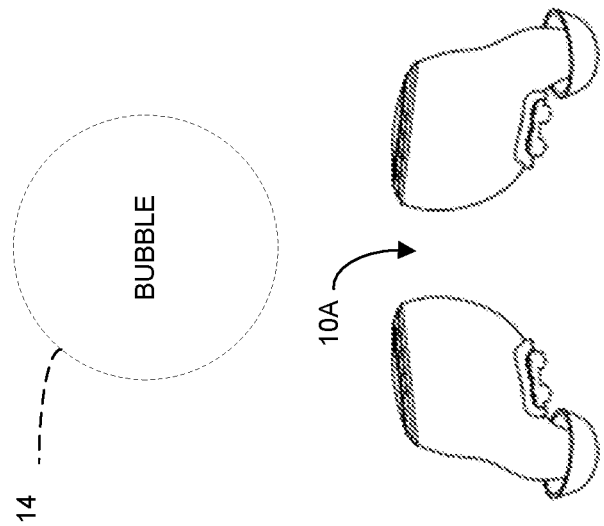
FIG. 4

AUDIO-BASED SOCIAL MEDIA PLATFORM

PRIORITY STATEMENT

This application is a continuation of U.S. Non-provisional patent application Ser. No. 17/677,597, filed Feb. 22, 2022, which is a continuation of U.S. Non-provisional patent application Ser. No. 15/716,204, filed on Sep. 26, 2017 now U.S. Pat. No. 11,283,742, which claims priority to U.S. Provisional Patent Application 62/400,391, filed on Sep. 27, 2016, all entitled "Audio-based social media platform", hereby incorporated by reference in their entirety.

FIELD OF THE INVENTION

The present invention relates to audio-based social media communication using wearable devices. More particularly, but not exclusively, the present invention relates to an audio-based social media platform.

BACKGROUND

Social media provides users with a computer-mediated tool to create, share, and exchange information. Computer-mediated tools such as Facebook chats, Instagram posts, LinkedIn, and text messaging all necessitate the use of a screen for the exchange of information. Teenagers in the United States spend about nine hours per day in front of a screen. Therefore, what is needed is a new form of communication with a completely screen free messenger interface.

SUMMARY

Therefore, it is a primary object, feature, or advantage of the present invention to improve over the state of the art.

It is a further object, feature, or advantage of the present invention to provide enhanced auditory communication using wearable devices.

It is a still further object, feature, or advantage of the present invention to provide users with a social media network of people using audio-based communication.

Another object, feature, or advantage is to interact with others without the need to use keyboards or screens.

It is still a further object, feature, or advantage of the present invention to provide the user with a means of sending audio-based communication via a gesture.

It is another object, feature, or advantage of the present invention to provide an individual with the ability to share audio messaging with an individual person, a group of people, or even strangers.

Yet another object, feature, or advantage of the present invention is to associate an audio message with a particular location.

A further object, feature, or advantage of the present invention is to provide for a social media experience that emulates real life.

A still further object, feature, or advantage is to allow for personal and immediate communications between people.

Another object, feature, or advantage is to allow for a social media experience that promotes conversational interaction and authentic interactions.

Yet another object, feature, or advantage is to provide for a social media experience, which may be used for purely social or business related interactions including those, which promote customer engagement.

A further object, feature, or advantage is to provide for a social media experience which need not result in interactions being permanent and allows for interactions which are private.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a method for audio-based social media messaging for a wearable device includes generating a first audio message using a wearable device, the wearable device having at least one microphone and at least one speaker and conveying the first audio message from the wearable device to an audio-based social media platform using a wireless radio transceiver within the wearable device. The method may further include generating social media data associated with the first audio message at the wearable device and conveying the social media data to the audio-based social media platform using the wireless radio transceiver within the wearable device. The social media data may include delivery data indicating one or more users on the social media platform to receive the first audio message, a location associated with where the first audio message is generated or where the wearable device is located when the audio message is sent. The method may further include receiving a notification from the wearable device that a second audio message is available. The method may further include playing the second audio message using the wearable device.

According to another aspect, a wearable device configured to support an audio-based social media network. The wearable device may include a wearable device housing, at least one speaker associated with the wearable device housing, at least one microphone associated with the wearable device housing and a wireless transceiver disposed within the wearable device housing. The wearable device may be configured to connect to the audio-based social media network through the wireless transceiver to send and receive audio messages.

According to another aspect, a method for providing audio-based social media messaging to a plurality of wearable devices, each of the wearable device having a speaker and a microphone includes steps of receiving audio messages and audio message identification and delivery data from the plurality of wearable devices, storing the audio messages and the audio message identification and delivery data on a server platform, and delivering one or more of the audio messages to one or more of the plurality of wearable devices based on the audio message identification and the delivery data.

According to another aspect, a method for audio-based social media messaging for a wearable device is provided. The method includes generating a first audio message using a first wearable device, the first wearable device having at least one microphone and at least one speaker and no screen display, and sending the first audio message from the first wearable device over a network to an audio-based social media server platform using a wireless radio transceiver within the first wearable device. The method may further include storing the first audio message on the audio-based social media server platform for a time period, and communicating the first audio message on the audio-based social media server platform to a second wearable device, the second wearable device having at least one microphone and at least one speaker and no screen display. The method may further include generating social media data associated with the first audio message at the first wearable device and conveying the social media data to the audio-based social media platform using the wireless radio transceiver within the first wearable device.

BRIEF DESCRIPTION OF THE DRAWINGS

Illustrated embodiments of the disclosure are described in detail below with reference to the attached drawing figures, which are incorporated by reference herein.

FIG. 2 illustrates an example of a bubble which multiple users and their associated wearable devices are a part of.

FIG. 4 illustrates a bubble being popped.

DETAILED DESCRIPTION

Figure 1:
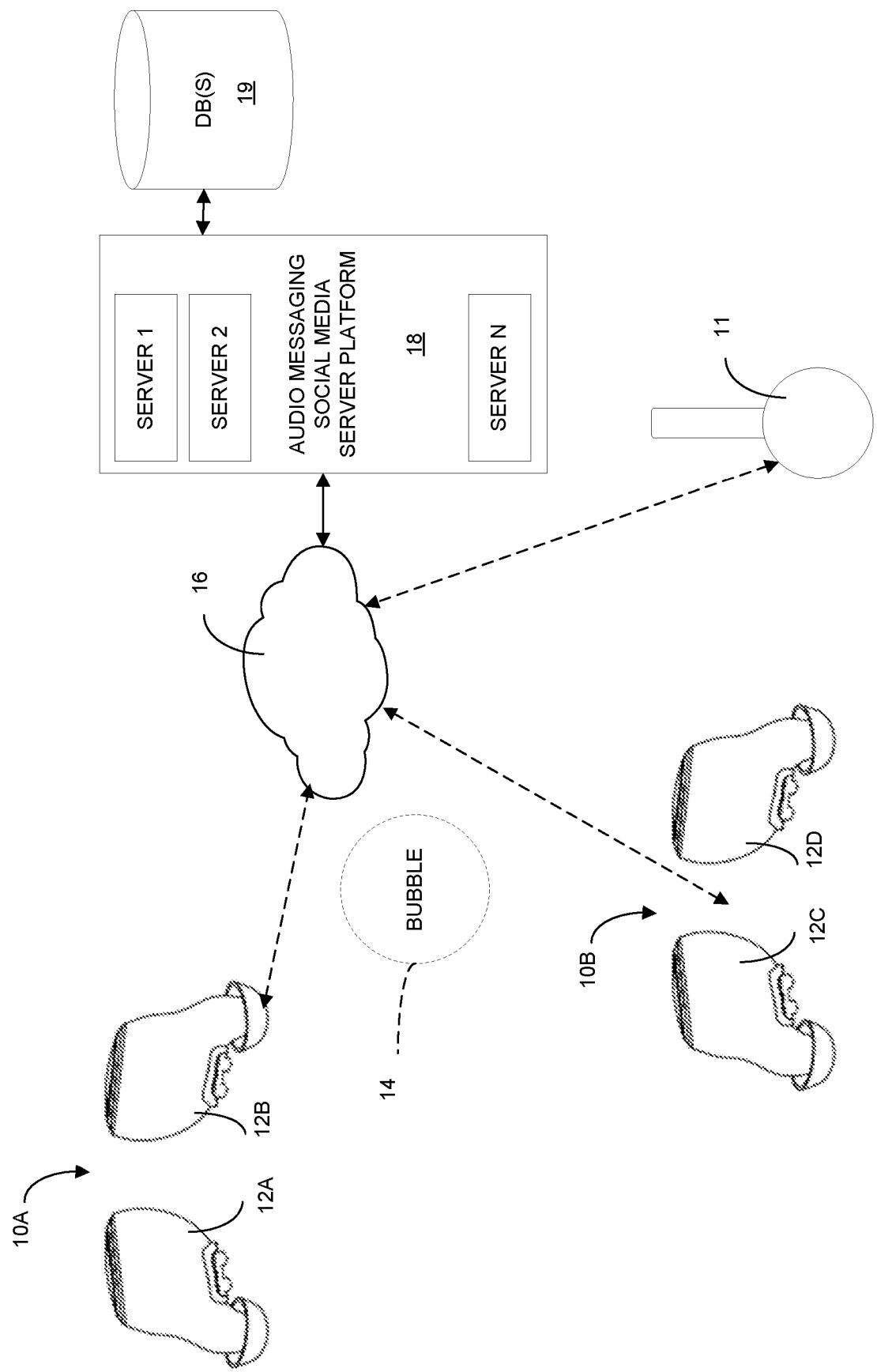
FIG. 1 is a pictorial representation depicting one example of wearable devices interacting with an audio-based social media platform.

The present invention relates to an audio-based social media messaging platform or experience and related systems and methods. Current social media applications generally provide users with a screen-based method of sharing information that focuses on typing and reading information. These social media sites are limited in the manner and location in which the user may communicate information. Users must be in places they can type out a message, and have their electronic devices with them. One of the criticisms of such social media usage is that users can miss experiencing life around them because of their fixation on a display. Another problem relates to safety. If users stare at screens while they walk, drive, or engage in other activities, the users put themselves and/or others in danger. Therefore an audio-based social media messaging platform as shown and described herein allows for removing the need to rely on a display and promotes more natural social media communications. Thus, chats may occur without keyboards or screens and while a user is otherwise interacting with their environment. The term "bubble" is sometimes used herein when referring to aspects of the invention. As used herein, a "bubble" is associated with an audio message that may have a particular reach. It may include the content of one or more audio messages as well as convey inclusiveness or reach (e.g. bubbles may grow such as to include others or add to the messaging) and may also convey a temporary nature of the communication (e.g. a bubble may be popped).

To trigger the audio-based social media application or functionality, a gesture may be used. The gesture may be used as input to a wearable device such as an earpiece having one or more microphones. Once triggered or activated an audio message or bubble may be sent by simply speaking. The audio message or bubble may be of different types and have different delivery options associated with it. For examples, a user may send an audio message in the form of a bubble to other users in their social media network or group or sub-group within their social media network or list of contacts within the social media network. Alternatively, the user may send an audio message or bubble to a single recipient. A user may also make the bubble "fly" and allow the bubble to be shared with other users of the audio-based social media platform who are not within the list of contacts associated with the user. Alternatively, a user may "stick" the audio message or bubble to a particular location (such as a geolocation associated with the user's current location or other location) so that other users may only hear the audio message or join the bubble when present at the location.

A list may be maintained locally and/or on a server associated with the audio-based social media platform. The list may include a plurality of different contacts associated with a user. It is contemplated that a user may build this list or add to it individually. In addition, or alternatively, the audio-based social medial platform may scan any number of different social media channels associated with a user in order to add contacts into this list. This may include email contacts, social media contacts, or other types of contacts. A user may invite someone to message or join a bubble in one tap or less.

In addition, artificial intelligence may be used to generate an audio message around a user so that the user does not feel alone and to make the social media platform a more inclusive and positive experience for all users. The audio message may relate to the location of the user, the environment of the user, or otherwise be of interest to the user. For example, the audio message may contain good news or interesting information. In addition, a user may create a bubble which is directed to an artificial intelligence system and the response may then be a part of a bubble.

There are numerous different types of messages. For example, family members may leave messages for one another. Thus, for example, a mother could create a bubble stating, "There is some lasagna in the fridge just heat it up, mom." The mother could share this directly to one or more children. Alternatively, the mother could attach this to a location at or near the refrigerator or within the kitchen so that the bubble would be available at an appropriate when the children are in the kitchen. This example is an example of an indoor bubble.

Similarly, a bubble may be attached to an outdoor location. For example, a bubble may be attached to location that states "from here you have the best view on the bay bridge." Thus, when individuals open to receive messages are at the location they can hear the message of this bubble and that promotes active engagement with their environment.

A bubble may also be epic in nature. For example, a bubble may be sent which states "around cape canaveral you can find a lot of bubbles from Neil Armstrong bubbling about Apollo 11." Of course, bubbles may be otherwise epic in nature depending upon their content or environment.

A bubble may also be a service bubble. For example, a restaurant guidebook, online review site, or other service provider may leave a message associated with a restaurant such as, "In this lovely restaurant everything is good. Try the red thai curry their most famous dish." Thus, a person may have information available to them in the form of a bubble at the place and time of need.

In addition, messages may be created with artificial intelligence or which are directed to artificial intelligence may be created. For example, a messages of "I wonder where there is the next good indian place?" may be created or the message "Where is the next good indian place?" and these messages may be directed towards an artificial intelligence system for responding such as by selecting a pre-existing bubble (e.g. a service bubble previously created) or creating a response to add to a bubble.

Group bubbles is another type of bubble that may be set. For example, a bubble may be sent to or shared with a plurality of recipients that states, "Let's create a Saturday barbeque bubble!." Once created, messaging associated that event may be associated with the bubble.

A live bubble may be sent such as "Let's link with BUBBLE!" thereby inviting one or more additional individuals to communicate with one another using the platform.

A "spread bubble" such as "Random Jokes & Wisdom" may be sent. The spread bubble may be used to collect messages from any number of different users and such a bubble will grow over time.

A "love bubble" such as "seeking a good night, male 28" may be sent. This type of bubble may be sent to recipients open to receiving this type of bubble.

It is to be understood that the above examples of different types of bubbles is not limiting and that any number of different types of bubbles are contemplated based on the content of the bubble, the manner in which the bubble is to be disseminated, the location of the bubble, the recipient(s) of the bubble, the source of the bubble, or otherwise.

It is further contemplated that bubbles may be popped. Thus, unlike certain forms of social media contents of bubbles need not be public nor permanent but may be fleeting and ephemeral. Once popped a bubble may simply cease to exist no longer stored anywhere or accessible by anyone. Alternatively, once popped the bubble may be temporarily stored and marked for deletion according to a bubble retention policy or based on user preferences with the possibility of restoring the bubble such as if the bubble was inadvertently or prematurely popped. It is contemplated that different rules may be implemented regarding who has permission or authority to pop a bubble. For example, anyone who creates the bubble may pop it, anyone who receives the bubble may pop it, only the creator may pop it, only the receiver may pop it, if it is a group bubble only the creator may pop it, the bubble may automatically pop after a set time period or on a certain time and date, after a certain number of listens, or any number of different rules may be applied. Note that the rules may be based in whole or in part on user preferences and that different rules may apply for different types of bubbles. For example, a service bubble may pop after it has been listened to a set number of times if a service provider only pays for a set number of listens. It is also contemplated that meta data about a bubble may also potentially be maintained after a bubble has been popped such as information about who was a part of the bubble or other information which does not include the actual audio message. It is also contemplated that some types of bubbles may be effectively permanent in nature where desired.

The ability to pop a bubble may be advantageous in a number of different situations and for a variety of different reasons. For example, the ability to pop a bubble allows for interactions between individuals to be temporary in nature and not permanent and potentially public. Therefore the use of bubbles may serve to better emulate real life person-to-person conversations and be more authentic. This may also be more advantageous for customer engagement as well such as interactions between an individual and customer support or other types of business interactions where it is helpful to promote authenticity and allow for conversational interaction.

FIG. 1 illustrates one example of a system that includes an audio-based social media platform. As shown in FIG. 1 a first wearable device or system 10A in the form of one or more earpieces 12A, 12B may create an audio message as part of a new or existing bubble, wherein a second wearable device or system 10B in the form of one or more earpieces 12C, 12D is also a part of the bubble 14 or otherwise has access to or interacts with the bubble 14. Alternatively, other types of wearables may be used including over-the-ear ear phones 11. The audio message and related data such as delivery data or meta data about the bubble may be communicated over a network to an audio messaging social media server platform. The audio messaging social media server platform 18 may include one or more servers which may be hardware based or virtual servers. Where multiple servers are present load balancing may be provided. The server platform 18 is in operative communication with one or more databases 19 or other data storage which may store audio messages and related data including delivery data such as identification of others within the bubble, a location or geolocation to which the bubble is tethered, a time at which the message is to be delivered, or other information.

The servers may provide for any number of different functions. For example, the servers may be configured to filter the messages from the bubble. Thus, if audio messages are negative or inappropriate based on policies of the social media platform, or according to user preferences, the audio messages may be deleted or returned to the sender with the sender being notified that the message will not be permitted within a bubble. Such content filtering allows for the social media platform which promotes positive communications.

Note that the wearable devices 10A, 10B may access the network 16 in any number of ways depending upon their hardware configuration. For example, the wearable devices may include Bluetooth or Bluetooth wireless transceivers which communicate with mobile devices (not shown) such as phones or tablets which then access the network through a cellular transceiver or Wi-Fi transceiver. Alternatively, the wearable devices may include a cellular transceiver of Wi-Fi transceiver, or the network may be otherwise accessed.

Although the wearable devices shown are in the form of earpieces which may be ear bud earpieces or over-the-ear earphones or other form factors, other types of wearable devices may be used such as articles of clothing, jewelry items, watches, eye glass(es), or other wearable devices. In addition, note that no screen displays are required for the wearable devices because the social media network is audio messaging social media platform. Thus, the audio messages may be sent, received, stored, shared, deleted, or other actions may be taken without use of a screen display by a user.

Figure 2:
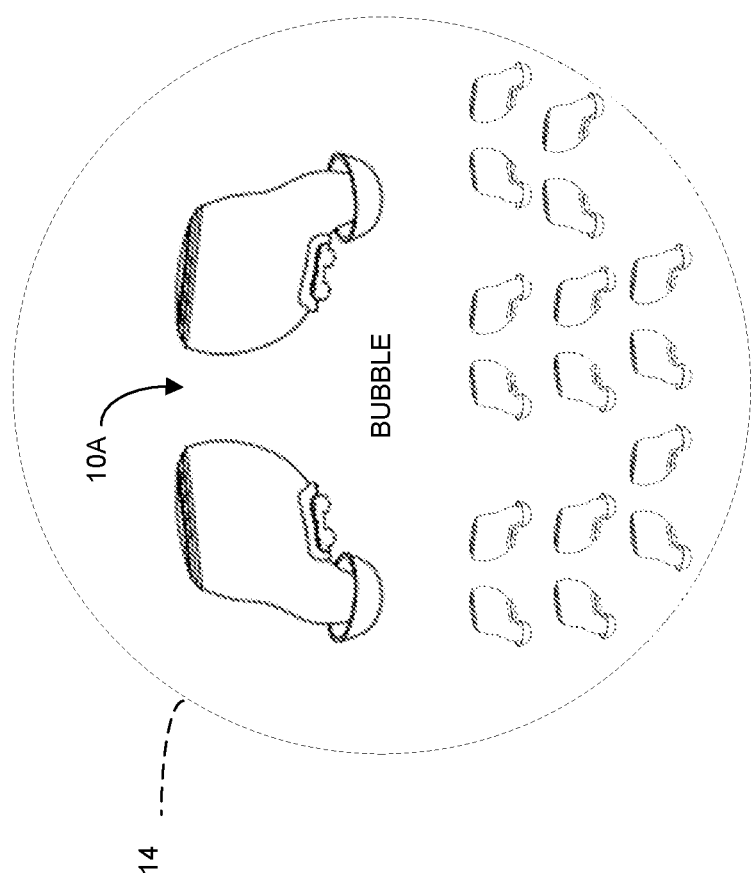

FIG. 2 illustrates one example of a bubble 14. As shown in FIG. 2, multiple different users and/or their associated wearable devices may be a part of a bubble. Being a part of a bubble includes the ability to access audio messages associated with a bubble and/or create audio messages associated with bubble, or otherwise control the bubble 14.

Figure 3:
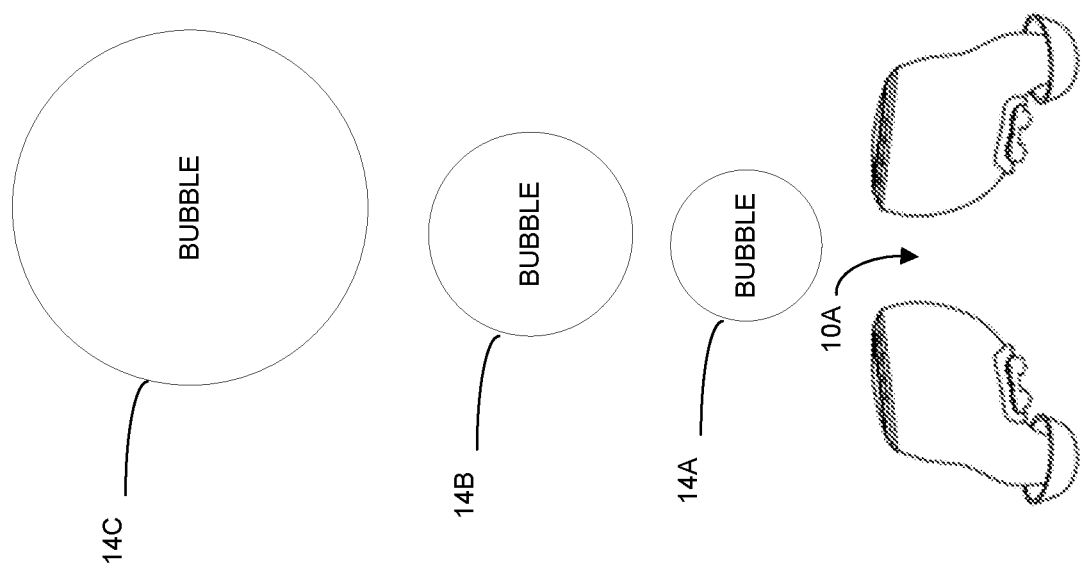
FIG. 3 illustrates a wearable device and a series of bubbles being generated by or received at the wearable device.

FIG. 3 illustrates another example of a series of bubbles 14A, 14B, 14C associated with a wearable device 10A. A user may create a bubble 14A, 14B, 14C or join a bubble or otherwise use a bubble for sending or receiving communications.

FIG. 4 illustrates a wearable device 10A and a bubble 14 and further illustrates that a user may choose to pop the bubble 14. Upon the popping of a bubble 14, the contents may no longer be available to the users or others who had access to the contents of the bubble 14. Thus, for example, if the bubble 14 included a plurality of audio messages, the audio messages would no longer be available in the normal course of usage.

Figure 5:
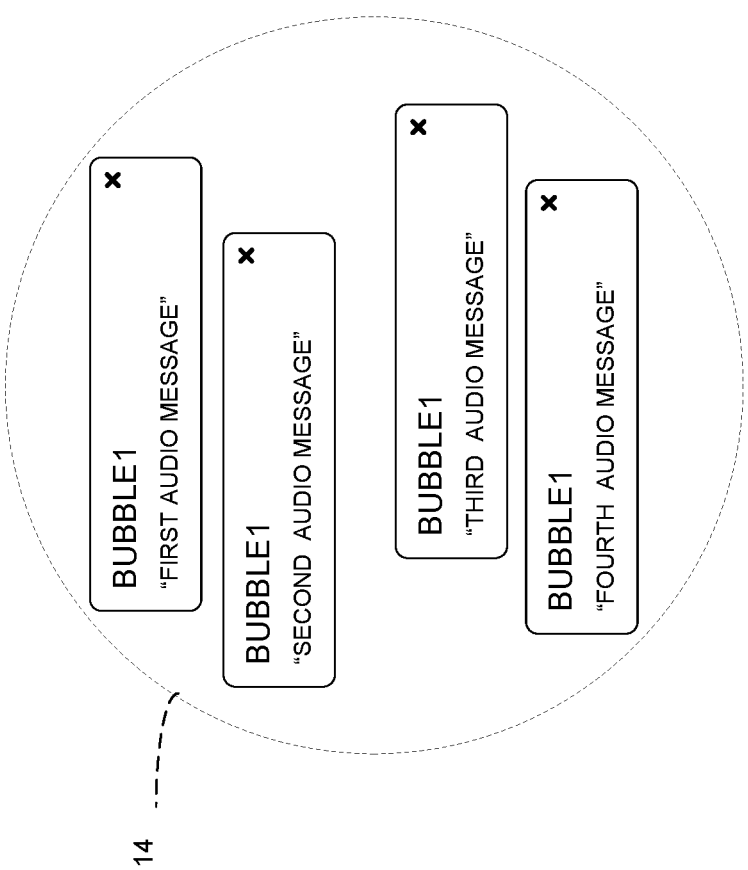
FIG. 5 illustrates a bubble with a series of audio messages contained therein.

FIG. 5 illustrates an example of a bubble 14 which includes a plurality of different audio messages between persons "within" the bubble 14. When the conversation is complete the bubble can be popped.

Figure 6:
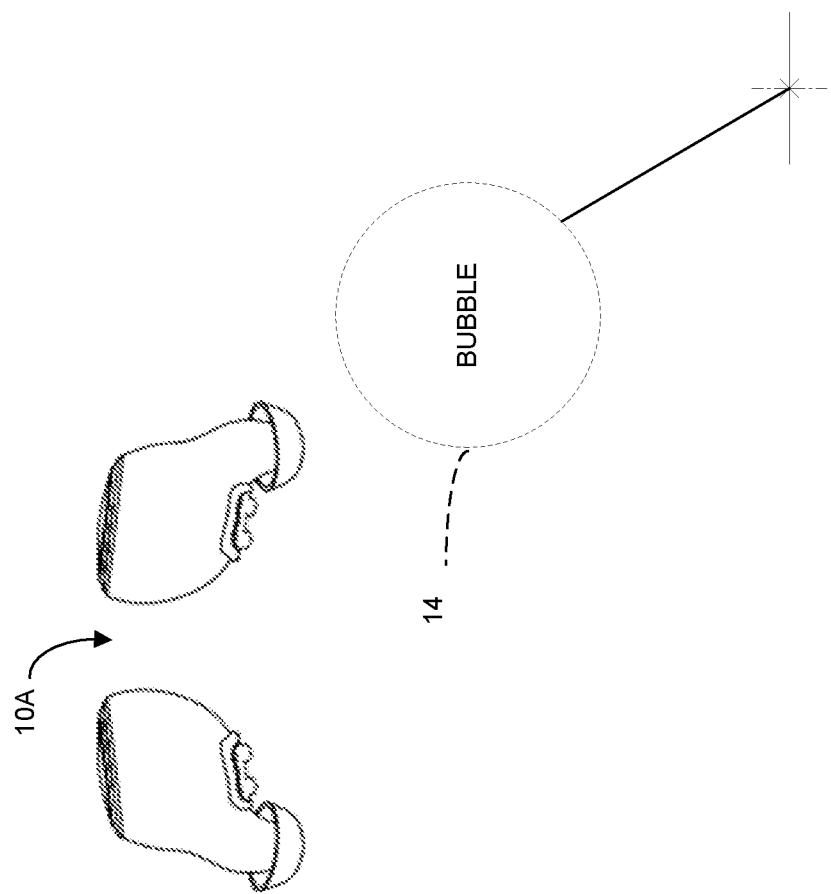
FIG. 6 illustrates a bubble anchored to a particular location.

FIG. 6 illustrates one example of interacting with a bubble which is anchored to a particular location or geolocation. Thus, in one embodiment, a user only accesses an audio message associated with that bubble when the user is present at that location or in very near proximity thereto. Similarly, while at a particular location, a user may create a bubble and anchor it to that location. A user may also be able to create bubbles for particular locations even when they are not physically present at that location. The locations may be geolocations or may be other relative locations. For example, a location may be anchored to a vehicle or other device.

Figure 7:
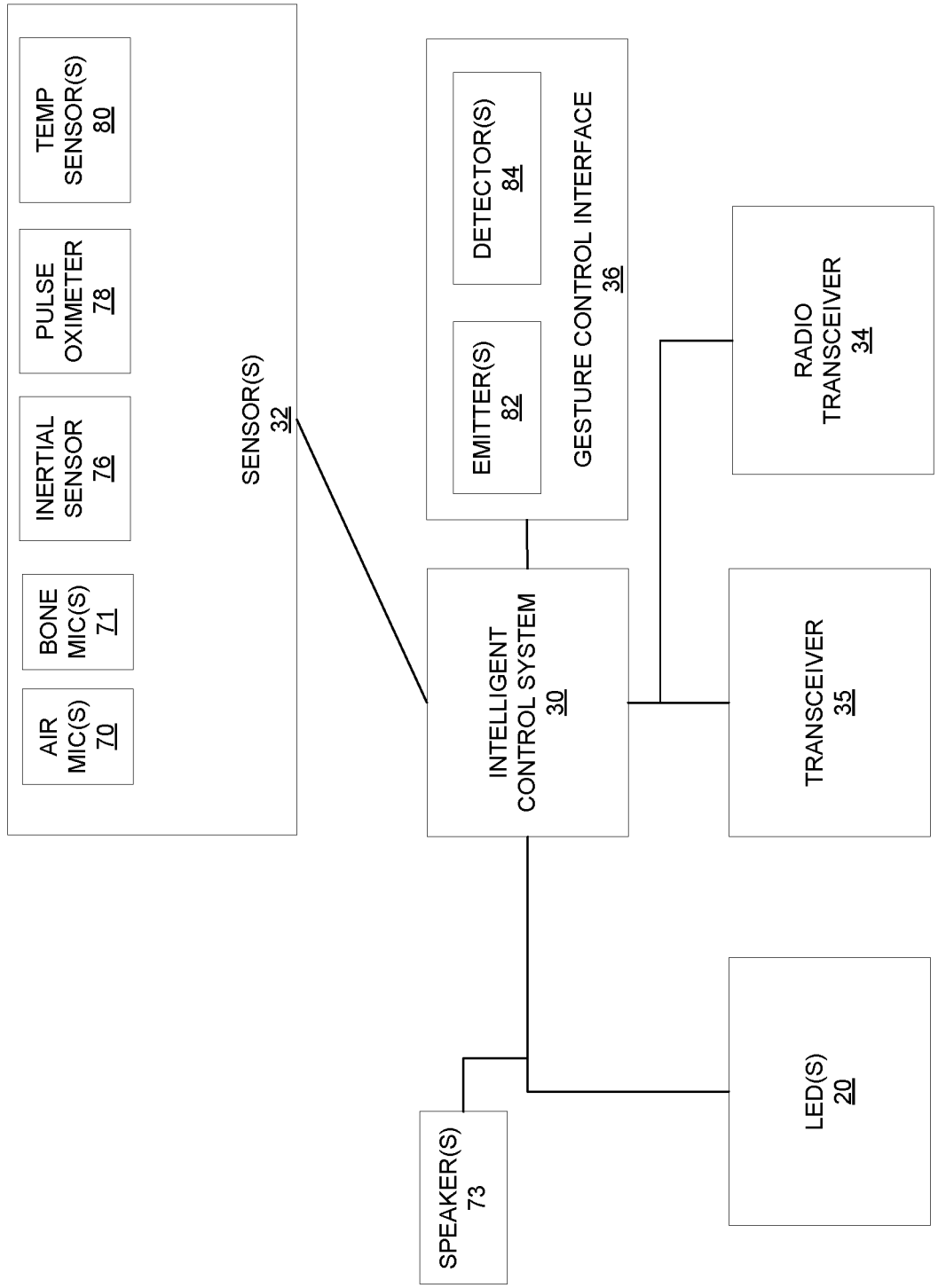
FIG. 7 illustrates a block diagram of one example of a wearable device.

FIG. 7 illustrates one example of an earpiece which may be used. Where more than one earpiece is used as a part of a wearable device certain functionality may exist in only the right earpiece or only the left earpiece and need not be present in both earpieces. For example, health monitoring sensors need only be present in one of the earpieces. As shown in FIG. 6, an intelligent control system 30 is shown which may include one or more processors. Sensors 32 may be operatively connected to the intelligent control system 30. Any number of different sensors may be used including air microphones 70, bone microphones 71, one or more inertial sensors 76, a pulse oximeter 78, and one or more temperature sensors 80. One or more speakers 73 may be present. The one or more microphones 70, 71 may be used for sensing voice sound communications from a user such as audio messages for including within a bubble. The one or more speakers 73 may be used for generating sound such as one or more audio messages from within a bubble. A gesture control interface 36 is shown which is operatively connected to the intelligent control system 30. The gesture control interface may include one or more emitters 82 and one or more detectors 84 which may be used for sensing gestures such as taps, double taps, triple taps, tap and holds, swipes, or other gestures. One or more LEDs may be present which are operatively connected to the intelligent control system 30. One or more transceivers may also be present such as a radio transceiver 34 which may be a BLUETOOTH or BLE transceiver or Wi-Fi transceiver, or cellular transceiver and a transceiver 35 which may be a near field magnetic induction transceiver. Of course, other types of transceivers may be used.

As shown in FIG. 7, various types of sensors may be present in the wearable device or in operative communication with or networked to the wearable device. Data from one or more sensors may be used to create or add to a bubble. The wearable sensors may be used to read user biometrics, including but not limited to pulse rate, blood pressure, blood oxygenation, temperature, calories expended, blood or sweat chemical content, voice and audio input, impact levels, and orientation (e.g., body, head, etc.). The wearable sensors may also determine the user's location, position, velocity, impact levels, and so forth. In some embodiments, the wearable device or the audio-based social media platform may create audio messages from data sensed by the wearable device. For example, the wearable device may track distance run, distance swam, distance biked, or related information. Periodic or milestone event measurements may be communicated to others who are a part of a bubble. For example, a marathon training group may receive messages from the wearable devices of others within the group regarding the activity of their fellow group members. Thus, group members can then add to the bubble by commenting with their own audio messages such as congratulatory messages or words of praise or encouragement. Note that the person performing the activity can continue to perform the activity and still access the audio message. Similarly, a weight loss group could communicate with one another after a wearable device communicates estimated calories expended or exercise performed by a group member. These examples further illustrate some of the benefits of an audio-based social media platform which allows individuals to participate in social media while also actively engaged in activities and doing so in a natural manner.

If a user is not available to hear the BUBBLE, the BUBBLE may be stored until the user can access it and listen to it. A wearable device allows the user to operate in a hands-free situation. Since the messages sent are spoken by the user instead of being typed, the user has the option to send, receive, and manage the BUBBLES in more convenient locations, such as while walking or driving or otherwise actively engaged in other activities.

It is to also be understood that the audio-based social media platform may maintain databases of its own users, or it may interact with another social network to reach more users. Other social networks include but are not limited to, FACEBOOK, FACEBOOK MESSENGER, GOOGLE, GOOGLE+, SNAPCHAT, LINKEDIN, YOUTUBE, VIBER, TUMBLR, TWITTER, BAIDU TIEBA, PINTEREST, INSTAGRAM, WHATSAPP or others. The audio-based social media platform may interact with other social media services in various manners. For example, a user's contacts on various different social media platforms may be integrated into a list of contacts on the audio-based social media platform. In addition, various other social media platforms may integrate with the audio based social media platform in one manner or another. For example, a user may select to have other types of social media messages converted into bubbles.

Preferably each BUBBLE contains good news or interesting stuff. Because of filtering that may be performed using artificial intelligence to delete hateful messages or otherwise negative or inappropriate messages, users will be encouraged to leave messages which feel playful and good.

The invention is not to be limited to the particular embodiments described herein. In particular, the invention contemplates numerous variations in the server platform used, the manner in which messages are conveyed, the manner in which messages are created, the manner in which messages are delivered, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A method for audio-based social media messaging, the method comprising:
  generating a first audio message by a first user using at least one microphone of a first device, the first device having a processor operatively connected to the at least one microphone and at least one speaker operatively connected to the processor;
  associating the first audio message with a bubble;

sending the first audio message from the first device over a network to an audio-based social media server platform using a wireless radio transceiver operatively connected to the processor within the first device;

storing the first audio message on the audio-based social media server platform for a time period associated with the bubble;

communicating the first audio message on the audio-based social media server platform to a second device, the second device having at least one microphone and at least one speaker;

receiving a second audio message at the first device from a second user of the second device;

associating the second audio message with the bubble;

playing the second audio message using the first device;

storing the second audio message on the audio-based social media server platform for a remaining portion of the time period; and removing the first audio message and the second audio message from the audio-based social media server platform after expiration of the time period such that both the first audio message and the second audio message are removed together when the bubble is popped, wherein the time period is determined based on rules defined by user preferences.

2. The method of claim 1 further comprising generating social media data associated with the first audio message at the first device and conveying the social media data to the audio-based social media platform using the wireless radio transceiver within the first device.

3. The method of claim 2 wherein the social media data comprises delivery data indicating one or more users on the social media platform to receive the first audio message.

4. The method of claim 3 wherein the social media data includes a location associated with at least one of a location where the first audio message is generated or a location where the first device is located when the first audio message is sent.

5. The method of claim 1 further comprising receiving a notification from the first device that the second audio message is available.

6. The method of claim 5 wherein a second set of social media data is associated with the second audio message.

7. The method of claim 1 further comprising receiving at the first device a selection of a type for the bubble.

8. The method of claim 1 wherein the time period is determined by a user of the first device.

9. The method of claim 1 wherein the time period is a time period defined by amount of time to share the first audio message a plurality of n times, where n is an integer number specified by at least one of a user of the first device and the audio-based social media server.

10. The method of claim 1 wherein the first device comprises a left earpiece and a right earpiece.

11. A method for providing audio-based social media messaging to a plurality of devices, the method comprising steps of:

receiving a plurality of audio messages and audio message identification and delivery data from the plurality of devices using an audio user interface, the plurality of audio messages including at least a first audio message from a first of the plurality of devices and a second audio message from a second of the plurality of devices;

storing the plurality of audio messages and the audio message identification and delivery data on a server platform;

delivering one or more of the plurality of audio messages to one or more of the plurality of devices based on the audio message identification and the delivery data; and removing the first audio message and the second audio message from the server platform according to a rule associated with the first audio message, wherein the rule is determined by user preferences setting a number of times the first audio message is listened to before the plurality of audio messages are removed.

12. The method of claim 11 further comprising receiving location information from the plurality of devices.

13. The method of claim 12 wherein the step of delivering is further based on the location information.

14. The method of claim 11 further comprising applying content filtering to the audio messages.

15. The method of claim 14 further comprising deleting or modifying one or more of the audio messages based on the content filtering.

16. The method of claim 11 wherein the first of the plurality of wireless devices is a first wireless earpiece.

17. The method of claim 11 wherein the second of the plurality of wireless devices is a second wireless earpiece.

18. A method for providing audio-based social media messaging to a plurality of devices, each of the plurality of devices having a speaker, a wireless transceiver, and a microphone, the method comprising steps of:

receiving a first audio message and a second audio message and audio message identification and delivery data from the plurality of devices;

storing the first audio message and the second audio message and the audio message identification and delivery data on a server platform;

delivering one or more of the first audio message and the second audio message from the server platform to one or more of the plurality of devices based on the audio message identification and the delivery data utilizing the wireless transceiver of the one or more of the plurality of devices; and removing the first audio message and the second audio message from the server platform after expiration of a time period associated with a bubble containing the first audio message and the second audio message such that the first audio message and the second audio message are removed simultaneously, wherein the time period is determined by user preference settings for the bubble.

19. The method of claim 18 wherein the plurality of devices include wireless earpieces.

* * * * *